United States Patent [19]

Cudden

[11] Patent Number: 5,749,425

[45] Date of Patent: May 12, 1998

[54] VEHICLE HOOD CHECK AND DAMPING MECHANISM

[75] Inventor: Charles Cudden, Farmington Hills, Mich.

[73] Assignee: Ford Global Technologies, Inc., Dearborn, Mich.

[21] Appl. No.: 660,367

[22] Filed: Jun. 7, 1996

[51] Int. Cl.$^6$ ................................................ B62D 25/10
[52] U.S. Cl. ................................ 180/69.2; 180/68.4
[58] Field of Search .......................... 180/69.21, 68.4, 180/296, 248, 69 C, 76, 89

[56] References Cited

U.S. PATENT DOCUMENTS

| | | |
|---|---|---|
| 3,747,271 | 7/1973 | Adamski . |
| 3,754,613 | 8/1973 | Stephens et al. ............ 180/69 C |
| 3,765,500 | 10/1973 | Reeves ........................ 180/77 TC |
| 4,125,170 | 11/1978 | Botz . |
| 4,263,978 | 4/1981 | Jackson ........................... 180/69 |
| 4,281,733 | 8/1981 | Miller et al. ................. 180/69 C |
| 4,359,119 | 11/1982 | Kammerman . |
| 4,566,552 | 1/1986 | Hoffman et al. . |
| 4,991,675 | 2/1991 | Tosconi et al. . |
| 5,435,406 | 7/1995 | Gaffoglio et al. ............ 180/69.21 |

*Primary Examiner*—Brian L. Johnson
*Assistant Examiner*—Jonathan E. Butts
*Attorney, Agent, or Firm*—Daniel M. Stock

[57] ABSTRACT

A vehicle hood movement dampening mechanism is pivotably connected between the vehicle and hood to exert a two-way cushioning action. The mechanism includes a variable length strut and a link arranged so that an internal resilient force element opposes increases in the strut length as the hood approaches its open and closed positions. The link exerts a pulling action on the variable length strut during either direction of hood movement.

6 Claims, 5 Drawing Sheets

VEHICLE HOOD CHECK AND DAMPING MECHANISM

BACKGROUND OF THE INVENTION

1. Field of the Invention

This invention relates to a two-way mechanism for checking and dampening the movement of a vehicle hood during its opening and closing strokes. The mechanism has a two-way action, i.e. it dampens (cushions) the hood movement during both the opening and closing strokes.

2. Prior Development

Trucks, particularly large trucks, have relatively large and heavy hoods overlying the engine compartment. Such hoods are commonly mounted for swinging movement around a hinge axis located at bumper level proximate to the lower end of the vehicle engine radiator, whereby the hood is swingable forwardly to gain access to the engine compartment.

Typically, excessive forward tilting motion of the hood is prevented by means of two hood check cable assemblies trained between the firewall of the engine compartment and the interior front corner area of the hood. In some cases such cable assemblies have self-contained coil springs therein that provide a limited amount of cushioning during the opening stroke of the hood. However, the resilient cushioning action is somewhat limited, and is confined to the hood opening movement. Such cables do not provide any damping action during the hood closing stroke. Also, such cables extend forwardly over the engine compartment, and thus partially obstruct access to the engine when the hood is in the open position.

U.S. Pat. No. 4,991,675, to James Tosconi, discloses a hood check mechanism that comprises a telescopic rod-sleeve unit trained between the hood and a slotted bracket on the vehicle; two compression coil springs encircle the sleeve. During the hood-closing stroke one of the springs is compressed, and during the hood-opening stroke the other spring is compressed so as to provide two-way damping of the hood movement.

One disadvantageous feature of the Tosconi arrangement is that the rod extends from the sleeve during the hood-opening stroke, and retracts into the sleeve during the hood-closing stroke. The magnitude of spring compression is relatively limited, so that shock loads are not fully absorbed. The load forces are relatively high.

Another disadvantage of the Tosconi system is that during the hood-opening stroke the rod-sleeve assembly is oriented at an acute angle to the hood motion. The spring compression is relatively ineffective because it does not coincide with the direction of hood movement.

A further disadvantage of the Tosconi system is that two rod-sleeve cushion assemblies are required (along the right and left side edges of the radiator).

SUMMARY OF THE INVENTION

The present invention relates to a two-way hood damping mechanism that comprises a variable length strut and a connected link trained between the vehicle and the hood. The strut comprises a resilient force means, e.g. a compression spring or a cushioned body of air, whereby the link exerts an extension force on the strut during the opening and closing strokes of the hood. The resilient force means is compressed to exert the desired damping action on the hood movement.

An advantageous feature of the invention is that the strut experiences a relatively great length change during the damping period. The resilient force means is enabled to absorb a significant percentage of the shock loadings.

Another advantageous feature of the invention is that during the damping periods the variable length strut is oriented in the direction of hood movement, such that the damping force is coincident with the direction of hood movement.

A further feature of the invention is that only one damping assembly is required. The mechanism is designed so that it can be oriented on the longitudinal centerline of the vehicle. The single damping assembly achieves economies, as regards hardware manufacturing cost and installation cost.

Further features of the invention will be apparent from the attached drawings and description of a preferred embodiment of the invention.

THE DRAWINGS

DESCRIPTION OF A PREFERRED EMBODIMENT OF THE INVENTION

Figure 1:
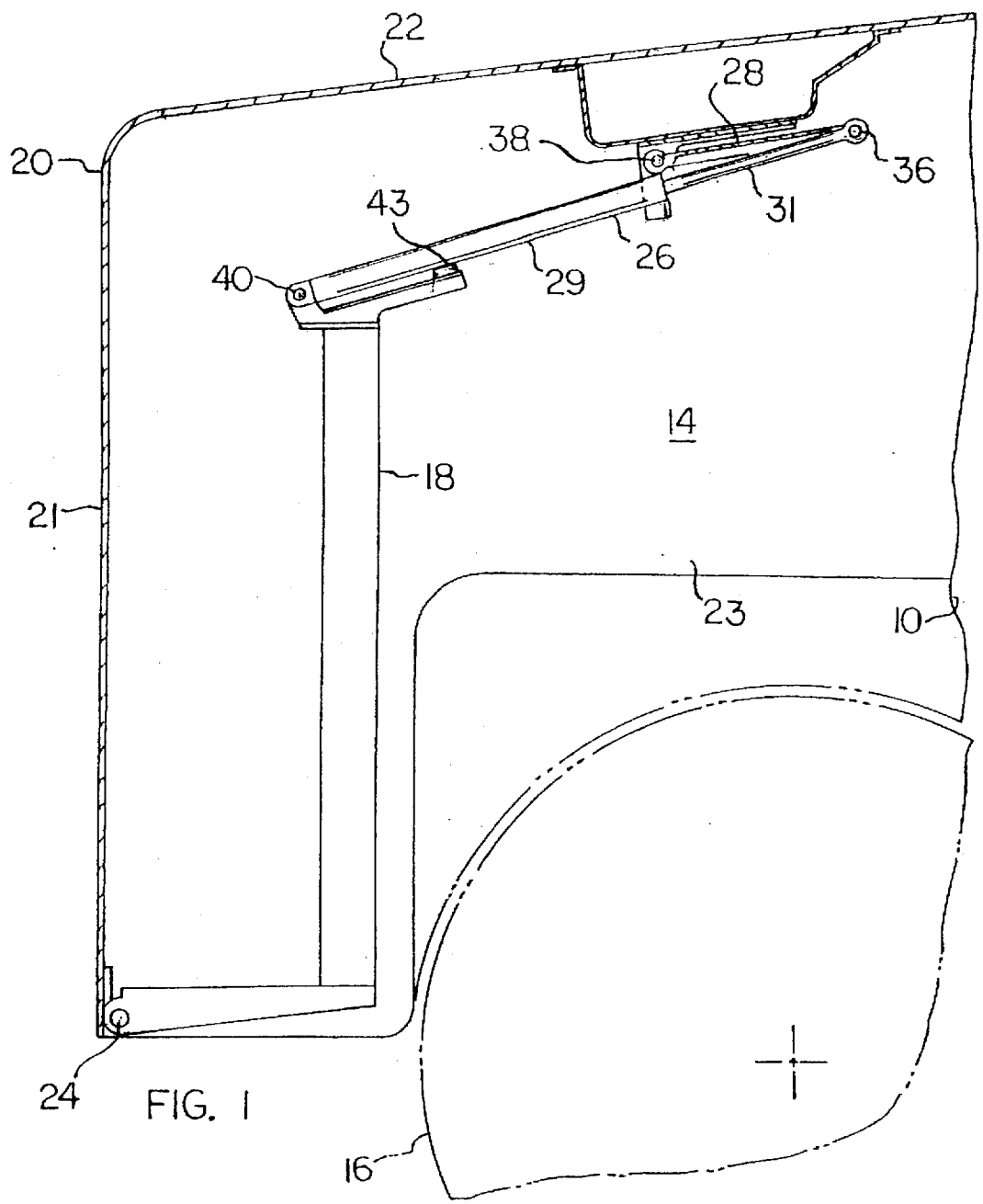
FIG. 1 is a simplified longitudinal sectional view taken through a vehicle hood equipped with a two-way dampening mechanism constructed according to the invention.

Referring to the drawings, and particularly FIG. 1, there is shown in phantom lines a vehicle truck body 10 having an engine compartment 14, and a set of front tires 16. The engine compartment houses the vehicle engine and various accessories, including an upright radiator 18.

The engine compartment is normally closed by a three dimensional hood 20 that includes a front wall 21, top wall 22 and two side walls 23. The hood is pivotally (swingably) connected to the vehicle for swinging motion around a pivot axis 24 located forwardly from the front tires 16 at approximately bumper level.

Figure 4:
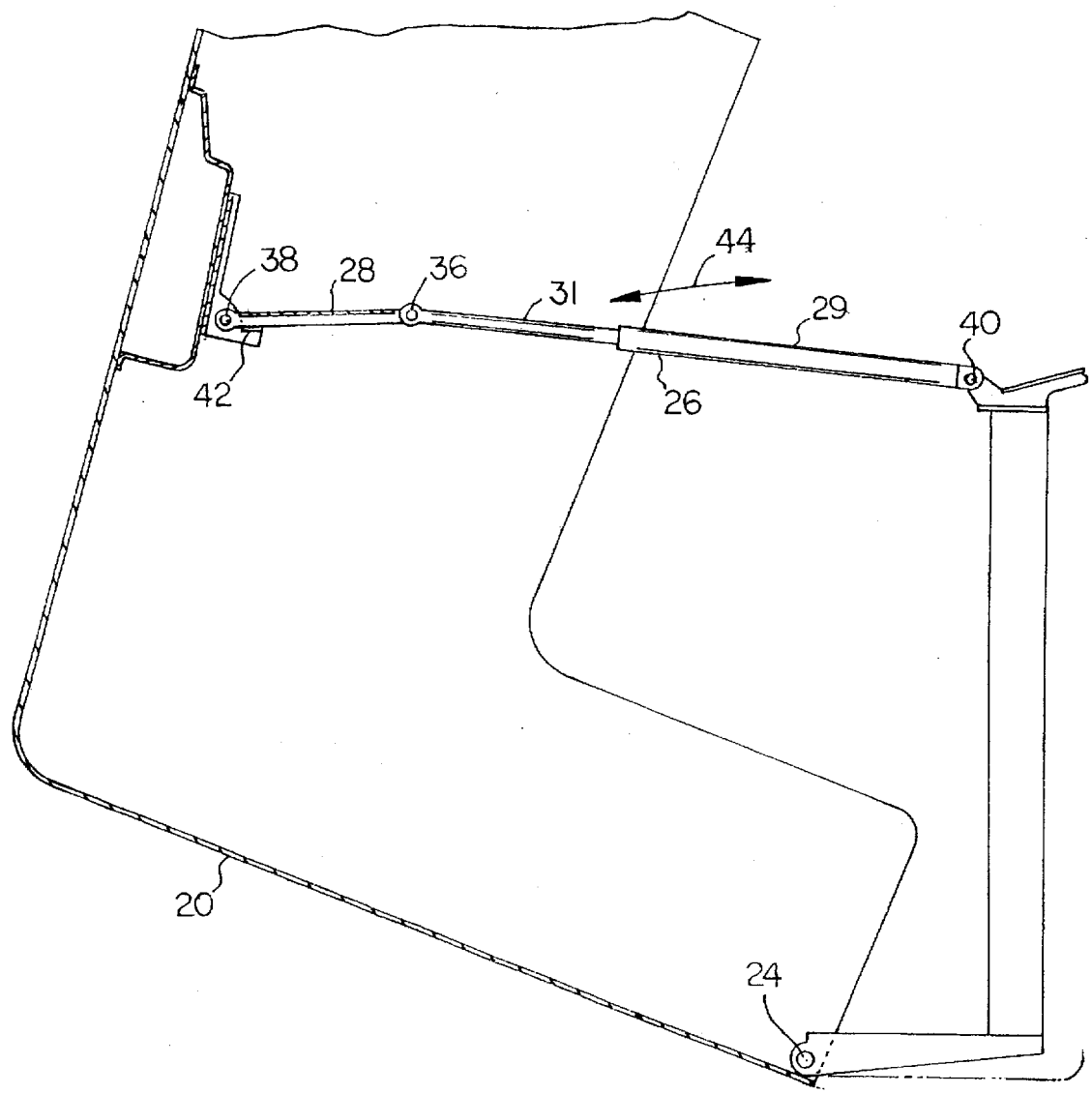
FIG. 4 shows the hood in its fully opened condition.

FIG. 1 shows hood 20 in its normal closed position (when the vehicle is to be driven on the highway). FIG. 4 shows the vehicle hood in its fully opened position for access to the engine compartment. The hood moves through an arc of about seventy degrees when moving between the open and closed positions.

Figure 2:
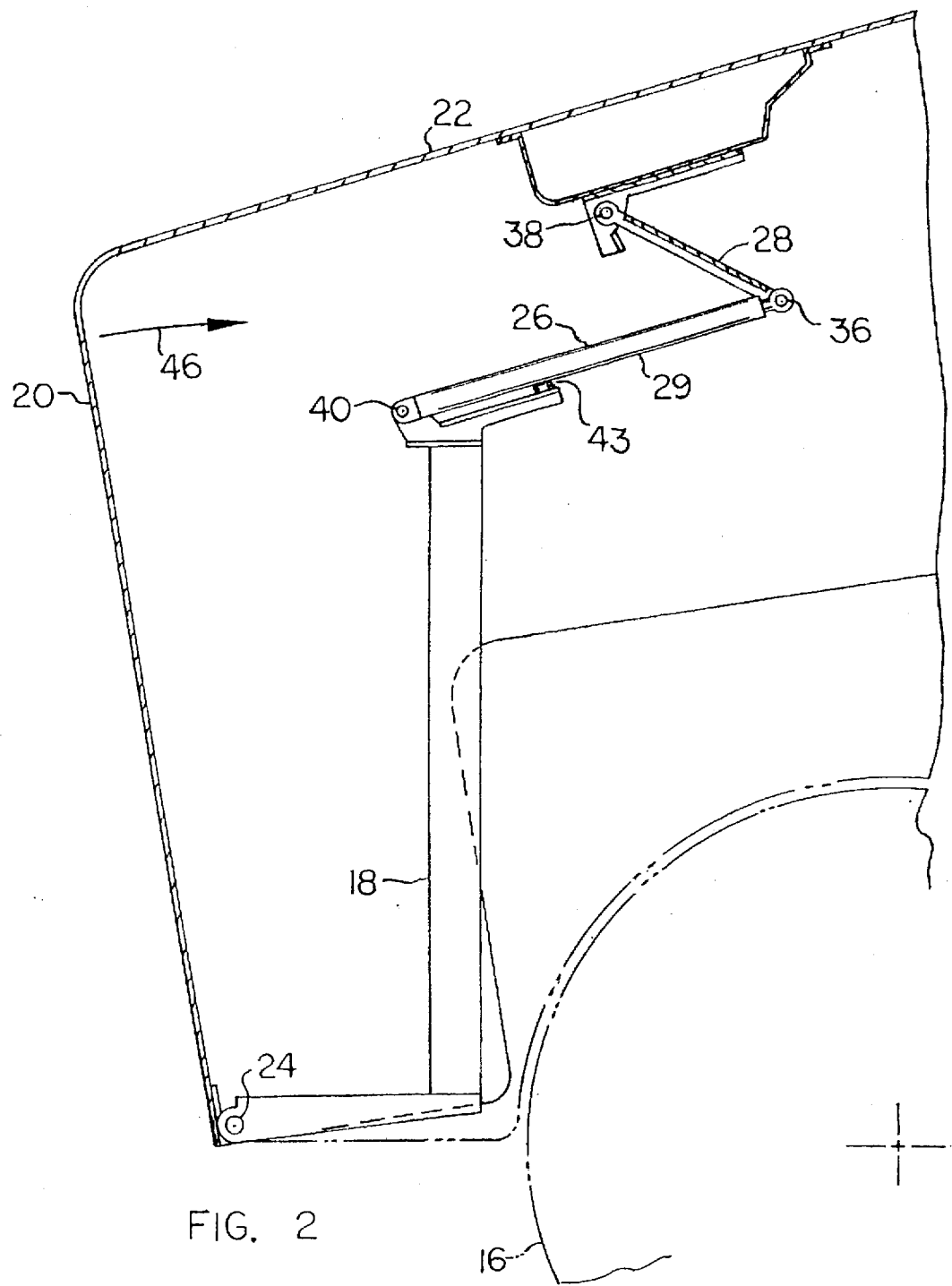
FIG. 2 is a fragmented view taken in the same direction as FIG. 1, but with the hood in a partially opened condition.
Figure 3:
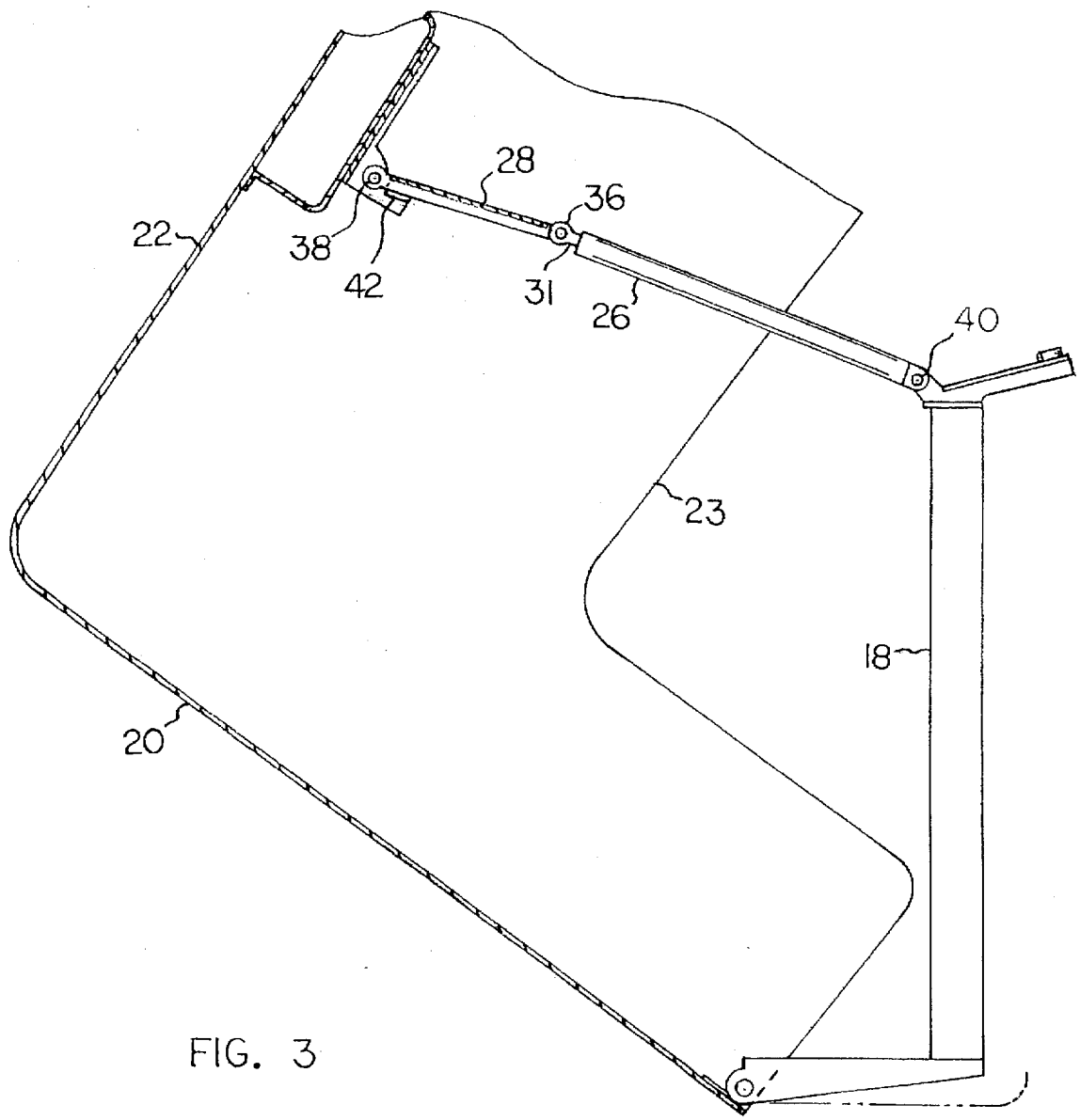
FIG. 3 is a sectional view showing the hood opened further beyond the FIG. 2 condition.

FIGS. 2 and 3 show the hood in two intermediate positions. As shown in FIG. 2, the hood is swung open about ten or fifteen degrees from its FIG. 3 closed position. FIG. 3 shows the hood at about fifteen degrees from its fully open position.

The invention is concerned with a two-way dampening mechanism for cushioning the hood movement as it approaches its open and closed positions. FIG. 2 represents the approximate starting point of the cushioning action when the hood is approaching its closed position (clockwise direction in FIG. 2). FIG. 3 represents the approximate starting point of the cushioning action when the hood is approaching its open position (counter clockwise direction in FIG. 3). Between the FIG. 2 and FIG. 3 positions the dampening mechanism is inactive.

The dampening mechanism comprises a variable length strut 26 and a link 28 trained between the vehicle body and hood 20. Strut 26 comprises an elongated cylinder 29 and a position rod 31 movable in and out of the cylinder to vary the strut length.

Figure 5:
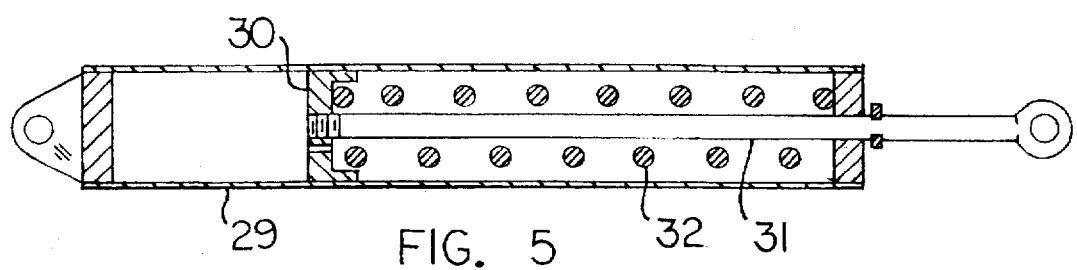
FIGS. 5 and 6 are longitudinal sectional views taken through alternate variable length strut constructions that can be employed in the dampening mechanisms depicted in FIGS. 1 through 4.
Figure 6:
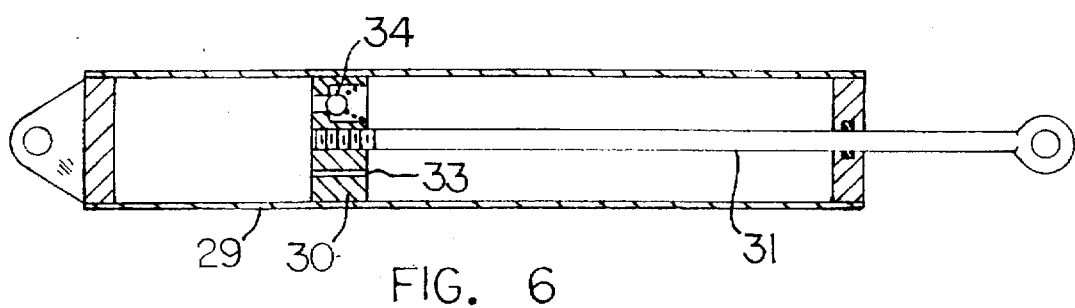

The variable length strut includes a self-contained internal resilient force means that opposes increases in the strut length. This resilient force means can comprise a compression coil spring, as shown in FIG. 5, or a contained body of air, as shown in FIG. 6. FIG. 5 represents the preferred construction.

FIG. 5 shows a piston-cylinder strut construction that includes a cylinder 29, piston 30, piston rod 31, and compression spring 32 exerting a leftward biasing action on the piston; spring 32 constitutes a resilient force means opposing increases in the strut length from the normal condition depicted in FIG. 5.

FIG. 6 shows a piston cylinder strut construction that includes an air cylinder 29, piston 30, piston rod 31, throttling orifice 33 and check valve 34. Air can flow in an unrestricted fashion through check valve 34 in a left-to-right direction. Air can flow in a restricted (controlled) fashion in right-to-left direction through orifice 33. Air to the right of piston 30 (in FIG. 6) constitutes a resilient force means opposing increases in the strut length.

FIGS. 5 and 6 represent alternate strut construction that can be employed in practice of the invention. FIG. 5 is the preferred construction.

Referring to FIGS. 1 through 4, link 28 has a pivotal connection 36 with one end of strut 26, and a swingable connection 38 with the hood top wall 22. Strut 26 has a pivot connection 40 with the vehicle body. Pivot connection 40 preferably comprises a bracket mounted on the upper edge of radiator 18 or the cowling associated with the radiator so that the pivot axis is located above the radiator.

When hood 20 is in the FIG. 1 closed position link 28 is buckled forwardly from its pivot connection 36 with strut 26. As the hood moves from the FIG. 1 closed condition to the FIG. 2 intermediate position strut 26 experiences a decrease in length that is unopposed by the resilient force means within the strut; the strut-link assembly is essentially inactive while the hood is swinging from its closed position through the FIG. 2 condition to the FIG. 3 condition.

As the hood continues its counter clockwise motion from the FIG. 3 intermediate position to the FIG. 4 open position the strut 26 experiences an increase in its length that is opposed by the resilient force means (FIG. 5 spring or FIG. 6 trapped body of air). The counter clockwise motion of the hood is thereby cushioned as the hood moves from the FIG. 3 position to the FIG. 4 closed position.

During clockwise motion of the hood from the FIG. 4 open position to the FIG. 1 closed position the hood movement is unopposed by the resilient force means until approximately the FIG. 2 condition is reached. At that point the strut 26 begins to experience an increase in its length (i.e. rod 31 moves out of cylinder 29), whereupon the internal resilient force means generates an opposing force that cushions the final stage of movement to the FIG. 1 closed position. During movement of the hood from the FIG. 2 position to the FIG. 1 position, cylinder 29 seats against a fixed stop 43, such that rod 31 has a relatively long cushion stroke out of the cylinder.

It will be noted from FIG. 4 that the pivot connection 38 comprises a bracket that includes a stop 42 engageable with link 28. The stop prevents the link from swinging uncontrollably to a point where the linkage could not return to the FIG. 3 condition during reverse motion of the hood. Stop 42 stabilizes link 28 in a condition substantially aligned with strut 26, as shown in FIGS. 3 and 4. During movement of the hood from the FIG. 3 position to the FIG. 4 position the stop 42 prevents link 28 from pivoting relative to strut 26; pivot connection 38 moves away from pivot connection 40 so that rod 31 enjoys a relatively long cushion stroke out of cylinder 29.

During the final stage of hood movement, in either direction, the strut 26 is substantially aligned with the direction (or path) of movement of the hood. In FIG. 4 the hood movement path around swing axis 24 is designated by arc 44; strut 26 is oriented to be substantially paralleled to arc 44 so that the resilient force means is fully effective for shock absorption purposes. In FIG. 2 the hood movement path 46 around swing axis 24 is at a relative small angulation to the strut 26 so that the resilient force means achieves a relatively good shock absorber action, without loss in effectiveness as would result from large angulations between the hood motion path and opposing force line of action.

During movement of the hood between its closed and open positions the variable length strut swings around pivot axis 40 approximately one hundred sixty degrees. Link 28 is oriented approximately parallel to the strut in the hood closed position and open position, such that the link is able exert a pulling force on the strut in either hood condition. Between the FIGS. 3 and 4 positions stop 42 stabilizes the link-strut assembly against uncontrolled pivotal motion. Between the FIG. 2 and FIG. 1 positions stop 43 stabilizes the strut against pivotal motion. Between FIG. 2 and FIG. 3 positions stops 42 and 43 are inactive.

The dampening mechanism is located relatively remote from hood swing axis 24 so that a relatively long cushioning stroke is realizable in either direction, i.e. from FIG. 2 to FIG. 1, or from FIG. 3 to FIG. 4. The location and construction of the dampening mechanism is also advantageous in that a single strut-link assembly can be used; this is due to the fact that the mechanism operates in an area generally above the radiator 18, where there is no obstruction to mechanism movement.

Preferably the strut-link assembly is located on the longitudinal centerline of the vehicle, i.e. over the radiator midway between the radiator side edges.

While the drawings show a specific arrangement and construction, it will be appreciated that some variation in structure, component proportions and detail can be employed in practice of the invention.

What is claimed is:

1. An automotive vehicle, comprising a vehicle body having an engine compartment, and an upright radiator in said engine compartment;

a forwardly-opening hood for said engine compartment having a swing axis located forwardly from the vehicle front tires at bumper level;

said hood being swingable through an arc of about seventy degrees during movement between the open and closed positions;

a two-way dampening mechanism for said hood;

said dampening mechanism comprising a variable length strut and a link pivotably connected to said strut;

said strut being swingable around an axis located above the radiator so as to swing through an arc of about one hundred sixty degrees during the opening-closing movement of the hood;

said link having a swingable connection with the hood for movement between a forwardly buckled connection with the strut when the hood is closed and an aligned connection with the strut when the hood is fully opened;

said strut and link being arranged so that the strut experiences a length increase as the hood approaches its open and closed positions, whereby said resilient force means generates a hood-movement damping force.

2. The vehicle of claim 1, wherein said link and said strut are located on the longitudinal centerline of the vehicle.

3. The vehicle of claim 1, and further comprising a first stop means (42) preventing relative motion between the strut and link as the hood approaches its open position, and a second stop means (43) preventing pivotal motion of the strut as the hood approaches the closed position.

4. An automotive vehicle comprising a vehicle body having an engine compartment and an upright radiator in the engine compartment, and a forwardly opening hood for said engine compartment; said hood being swingable between open and closed positions around a swing axis located forwardly from the vehicle front tires;

a two-way hood-movement damping mechanism trained between said hood and said vehicle body;

said damping mechanism comprising a variable length strut and a link pivotably connected to said strut;

said strut being pivotably connected to the vehicle body for swinging motion around an axis proximate to the upper edge of the radiator; said link being pivotably connected to the hood;

said strut comprising a resilient force means opposing an increase in the strut length;

said strut and link being connected to the vehicle body and hood so that said strut experiences a length increase as the hood approaches its open and closed postions whereby said resilient force means generates a hood-movement damping force; and said link having a buckled position extending forwardly from its pivotal connection with said strut when the hood is in its closed position; said link being substantially aligned with said strut when the hood is in its open position.

5. The vehicle of claim 4, wherein said variable length strut swings through an arc of about one hundred sixty degrees during the opening-closing movement of the hood.

6. A two-way dampening mechanism for a forwardly opening hood of a vehicle engine compartment, wherein the hood is swingable around an axis located forwardly from the vehicle front tires:

said dampening mechanism comprising a variable length strut and a link pivotably connected to said strut;

said strut comprising a resilient force means opposing an increase in the strut length;

said strut and link being pivotably connectable to the vehicle and hood so that the strut experiences a length increase as the hood approaches its open and closed positions, whereby said resilient force means generates a hood-movement damping force;

said link having a forwardly buckled connection with the strut when the hood is closed, and an aligned connection with the strut when the hood is fully opened.

* * * * *